(12) United States Patent
McNaught-Davis Hess et al.

(10) Patent No.: US 7,623,580 B2
(45) Date of Patent: Nov. 24, 2009

(54) SIMULTANEOUS MULTIPLE CHANNEL RECEIVER

(75) Inventors: Kendal McNaught-Davis Hess, Encinitas, CA (US); Manjit S. Gill, San Diego, CA (US); Donald Brian Eidson, San Diego, CA (US); Chi-Ping Nee, Santee, CA (US); Mats Lindstrom, San Diego, CA (US); Abraham Krieger, San Diego, CA (US); Fred Harris, Lemon Grove, CA (US)

(73) Assignee: NXP B.V., Eindhoven (NL)

( * ) Notice: Subject to any disclaimer, the term of this patent is extended or adjusted under 35 U.S.C. 154(b) by 553 days.

(21) Appl. No.: 10/882,083

(22) Filed: Jun. 29, 2004

(65) Prior Publication Data

US 2005/0190777 A1   Sep. 1, 2005

Related U.S. Application Data

(60) Provisional application No. 60/484,183, filed on Jun. 30, 2003, provisional application No. 60/534,176, filed on Dec. 31, 2003.

(51) Int. Cl.
*H04K 1/10* (2006.01)

(52) U.S. Cl. .................... 375/260; 375/316; 375/219; 375/267

(58) Field of Classification Search .............. 375/316, 375/260, 219, 267, 299
See application file for complete search history.

(56) References Cited

U.S. PATENT DOCUMENTS

| 5,247,541 A * | 9/1993 | Nakai ........................ 375/233 |
| 2003/0210749 A1 * | 11/2003 | Asjadi ....................... 375/260 |
| 2004/0125740 A1 * | 7/2004 | Gardner ..................... 370/208 |
| 2004/0138811 A1 * | 7/2004 | Teranishi et al. ............ 701/213 |
| 2004/0218692 A1 * | 11/2004 | McNeely ..................... 375/316 |

* cited by examiner

*Primary Examiner*—Shuwang Liu
*Assistant Examiner*—Kabir A Timory (57) ABSTRACT

A simultaneous multiple channel receiver ("SMCR") for receiving a combined signal having a plurality of carrier signals, where each carrier signal in the plurality of carriers signals corresponds to a frequency channel, and in response, simultaneously producing a plurality of output data stream signals, is disclosed. The SMCR may include a down-converter front-end capable of receiving the combined signal, a plurality of digital signal processors, wherein each digital signal processor of the plurality of digital signal processors is capable of producing an output data stream signal of the plurality of output data stream signals, and a multi-band filter in signal communication with both the down-converter front-end and the plurality of digital signal processors.

63 Claims, 10 Drawing Sheets

SIMULTANEOUS MULTIPLE CHANNEL RECEIVER

CROSS-RELATED APPLICATIONS

This application claims priority under 35 U.S.C. 119(e) to U.S. Provisional Application Ser. No. 60/484,183, titled "Simultaneous Multiple Channel Demodulator," filed Jun. 30, 2003, and U.S. Provisional Application Ser. No. 60/534, 176, titled "Satellite Multi-Choice Switch System," filed Dec. 31, 2003, both of which applications are incorporated in their entirety into this application by reference.

BACKGROUND OF THE INVENTION

1. Field of the Invention

The invention generally relates to the area of digital communication. Specifically the invention relates to a system capable of receiving satellite transmissions.

2. Related Art

The utilization of digital communication systems is growing at a rapid pace in modern society. Specifically, digital communication systems have become more common because they typically provide a higher level of performance than analog communication systems. As a result, communication systems such as television and radio are transitioning from analog systems to digital systems. Radio is transitioning from analog AM, FM and SW transmissions to digital and satellite radio transmissions. Similarly, television systems are transitioning to digital systems such as digital cable, digital television ("DTV"), high-definition television ("HDTV"), and satellite. In the case of television, satellite video transmissions are common and widespread around the world. Additionally, from the inception of convenient direct broadcast satellite ("DBS") services such as those provided by DBS service providers DIRECTV® and DISH Network® in the United States and similar services around the world, there has been a tremendous growth in the number of DBS subscribers.

Unfortunately, known satellite equipment utilized for receiving satellite video transmissions are not as user friendly as the old terrestrial analog television equipment. Specifically, known satellite equipment typically lacks the ability to allow a user to utilize two or more reception channels simultaneously.

Figure 1:
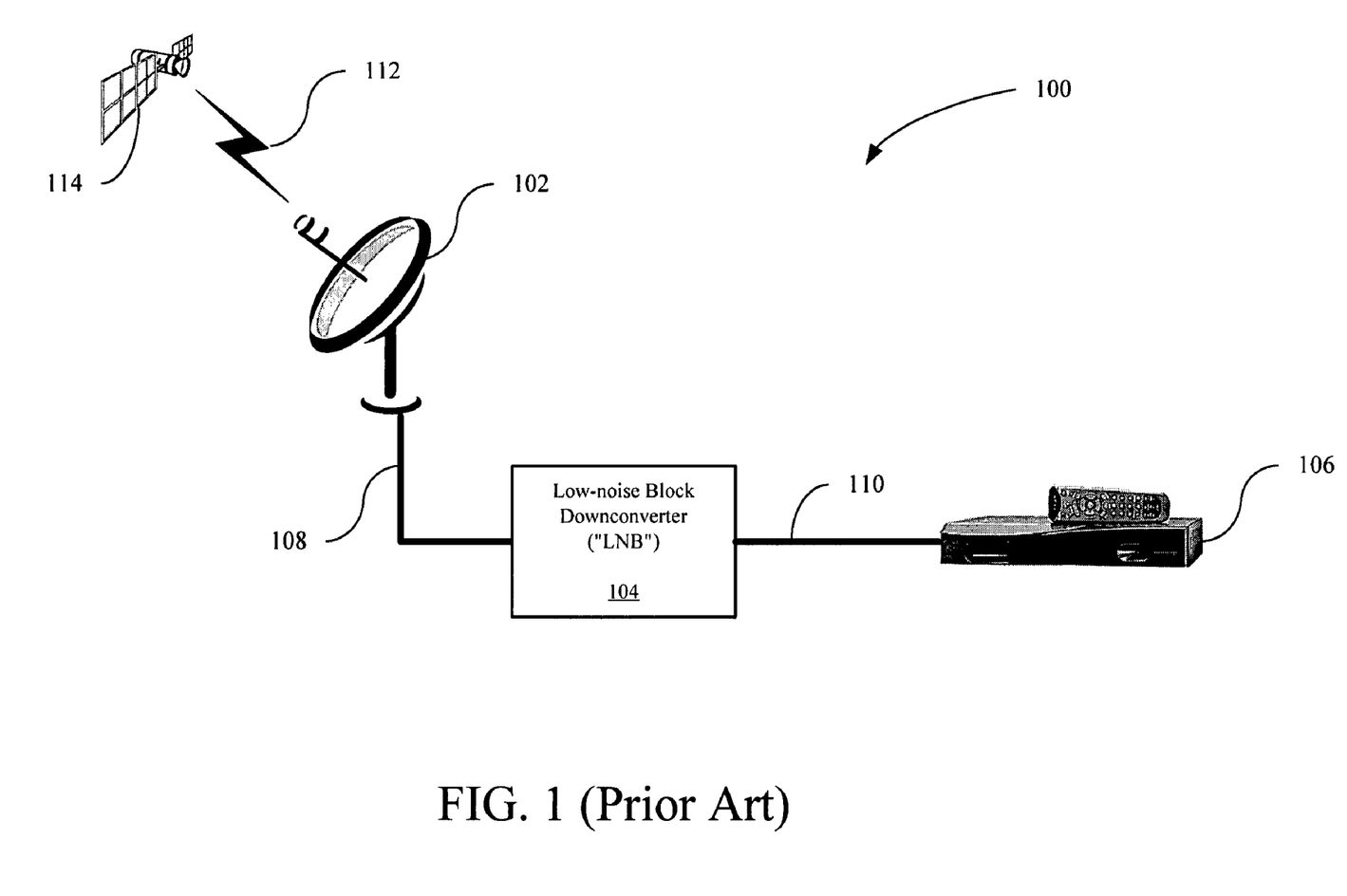
FIG. 1 shows a typically known DBS satellite reception system.

An example of this problem is shown in FIG. 1. In FIG. 1, a typically known DBS satellite reception system 100 having a DBS satellite antenna 102 (such as a parabolic reflector antenna known generally as a "dish antenna" or "dish"), a low-noise block converter ("LNB," also known as a low-noise block downconverter) 104 and a set-top converter box (generally known as set-top box "STB" and/or Integrated Receiver Decoder "IRD") 106 is shown. The LNB 104 is in signal communication with the DBS satellite antenna 102 and STB 106 via signal paths 108 and 110, respectively. The STB 106 may be typically a satellite receiver with a built-in decoder for unscrambling subscription channels broadcast by the DBS system provider (not shown). The STB 106 may be any generally known STB similar to the STBs produced by multiple manufacturers for both DIRECTV® and DISH Network®, or other similar types of DBS service providers.

In the case of a parabolic reflector antenna, it is appreciated by those skilled in the art that the DBS satellite antenna 102 and LNB 104 are packaged usually together as one unit and the LNB 104 is typically an active device. Examples of the DBS satellite antenna 102 may include an 18-inch parabolic reflector antenna or any other type of antenna such as a phased array, resonant plane, microstrip, patch, and/or active or passive antenna.

The LNB 104 is generally an amplifier that blocks low-end frequencies and receives the high-end frequencies utilized in DBS satellite transmissions. In many DBS systems utilizing a parabolic reflector antenna, the LNB 104 is generally located at the horn feed at the end of the arm projecting from the DBS satellite antenna 102. Typically, a single-output LNB provides one RF output for connecting a coaxial cable to feed a received DBS satellite signal to a single STB. A dual-output LNB typically has two RF outputs for distributing DBS satellite signals to two or more STBs. In a DBS satellite reception system 100, the LNB 104 typically downconverts received DBS satellite signals from a Ku-band signal (such as in the 12.2 GHz to 12.7 GHz range) to an L-band signal (such as 950 MHz to 2150 MHz range).

In an example of operation of the DBS satellite reception system 100, the DBS satellite antenna 102 receives DBS satellite signals 112 from a DBS satellite 114 and passes them to the STB 106, via signal path 110, after downconvertering the DBS satellite signals 112 with the LNB 104 (or LNBs if more than one). The STB 106 then tunes to and decodes a desired frequency channel of media content and passes that media content to an end media device (not shown) such as television, radio, video monitor, recording device or broadband modem where the media content may be video, audio and/or data.

Until recently, most DBS systems such as DBS satellite reception system 100 have not allowed multiple STBs (such as STB 106) to operate in combination with one or more DBS satellite antennas (such as DBS satellite antenna 102) because usually a STB (such as STB 106) has some type of intelligence (i.e., it has a processor, microprocessor, controller and/or microcontroller that runs some type of control software for the STB) that controls the LNB 104 (or LNBs) based on the desired frequency channels of media content that the STB 106 desires.

Additionally in the usual operation a DBS satellite system, such as DIRECTV® and DISH Network®, the DBS satellite system typically broadcasts each channel from their satellites with either a "left-hand" (known as left-handed circular polarization or "LHCP") or "right-hand" (known as right-handed circular polarization or "RHCP") circular polarization. Approximately half the frequency channels are broadcast with one polarization while the other frequency channels are broadcast with the opposite polarization.

Generally, the LNB 104 is capable of only receiving one type of polarization at a time and the STB 106 has an internal memory (not shown) that typically contains a table of values (that is typically downloaded from the DBS satellite 114) that represent the polarization of each frequency channel. The STB 106 then instructs the LNB 104, via signal path 110 (which may be a standard coaxial cable), to switch to the polarization that corresponds to the desired frequency channel of the STB 106. The STB 106 usually instructs the LNB 104 to switch between polarizations by placing a variable voltage on the signal path 110.

As a result, the DBS satellite reception system 100 does not allow multiple STBs to operate on one coaxial cable from the DBS satellite antenna 102 and LNB 104 combination because multiple STBs would not be able to coordinate switching the polarization of the LNB 104. The polarization of a frequency channel selection of one STB would interfere with the polarization of another channel selection on the other STB.

In a typical home environment this is a drawback for DBS systems compared to, as an example, standard non-DBS analog cable systems (i.e., cable television) and old terrestrial analog television equipment (i.e., standard over-the-air television and radio transmissions generally known as "terrestrial transmission systems"). In cable systems, a cable provider transmits the cable channels (whether analog, digital or combination of both) via one coaxial or fiber optic cable to a home. Additionally, in a terrestrial transmission system a user may utilize an external television antenna (generally known as the "outside antenna") to receive the terrestrial transmissions and feed them into the home via a single coaxial cable.

The end-users, such as residents of the home, may then split the coaxial cable with a general-purpose splitter into multiple coaxial cables that are capable of feeding the transmitted cable channels into multiple video monitors or recording devices via multiple cable receivers (or built-in television receivers within the video monitors and most recording devices such as video recorders and digital recorders). Each cable receiver is then capable of independently and simultaneously selecting different received cable or terrestrial frequency channels.

At present, the end-users in a home environment have become accustomed to connecting multiple video monitors, recording devices and/or cable receivers to a common coaxial system that is the result of simply splitting the input coaxial cable from the cable system. It is appreciated that in a typical modern home almost every room will have a coaxial cable that extends from a wall outlet. All these cables will be connected to either the outside antenna or the cable system via the coaxial splitter. As a result, the end-users in, a home environment expect, or at least desire, a similar convenience from an installed DBS satellite system. Unfortunately, the DBS satellite reception system 100 is not capable of allowing multiple STBs to connect to the LNB 104 and provide independent simultaneous channel reception by each individual STB.

Present attempts to solve this problem include utilizing multiple LNBs for each STB along with potentially utilizing multi-switches. However, these solutions are multi-cable approaches that are high cost and cumbersome to arrange in the typical home environment because they entail the increased cost of equipment such as multiple cables, multi-switch devices, combiners and splitters and the cost of labor in professionally installing the equipment. Once the equipment has been installed it is pseudo-permanent in nature because it is difficult to rearrange the equipment in the future. These approaches are still much more complicated than adding additional cable-ready tuners in a home-installed cable television system.

Therefore, there is a need for a system and method that provides a low cost solution for distributing DBS satellite signals on a single cable from the DBS satellite antenna to the home environment.

Figure 2:
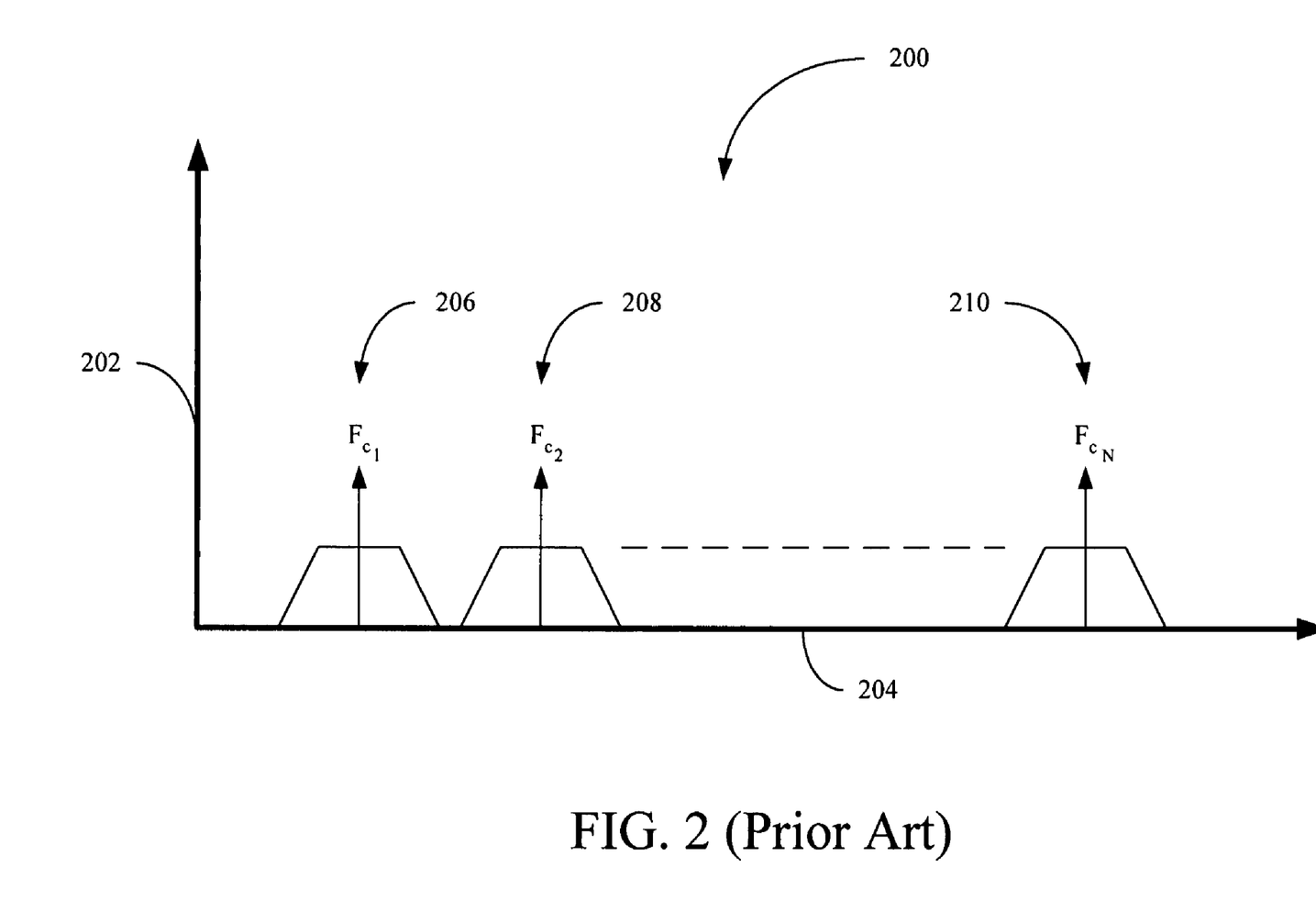
FIG. 2 is a plot of the frequency channel locations on an example of a continuous frequency spectrum.

If multiple DBS satellite signals are distributed on a single cable from the DBS satellite antenna 102, FIG. 1, to the home environment, the resulting example of the frequency spectrum may be described as a plot 200 of the magnitude 202 versus frequency 204 of the frequency spectrum of the multiple DBS frequency channels on a DBS satellite transmission as shown in FIG. 2. In FIG. 2, the frequency channels, such as frequency channel 1 centered at carrier center frequency $F_{c_1}$ 206, frequency channel 2 centered at carrier center frequency $F_{c_2}$ 208, and frequency channel N centered at carrier center frequency $F_{c_N}$ 210, are continuously distributed in plot 200 of the frequency spectrum.

The typical STB 106 is not capable of receiving all the frequency channels shown in plot 200. Therefore, allowing an end-user to view one frequency channel on a video monitor while simultaneously recording another frequency channel on a video recorder and/or watching one of more frequency channels within the typical picture-in-picture functions of most modern video monitors is not possible because generally known state-of-the-art DBS satellite STBs (such as STB 106) typically utilize, as an example, a STB architecture 300 shown in FIG. 3, where the STB architecture 300 is only capable of demodulating and decoding one frequency channel at a time.

Figure 3:
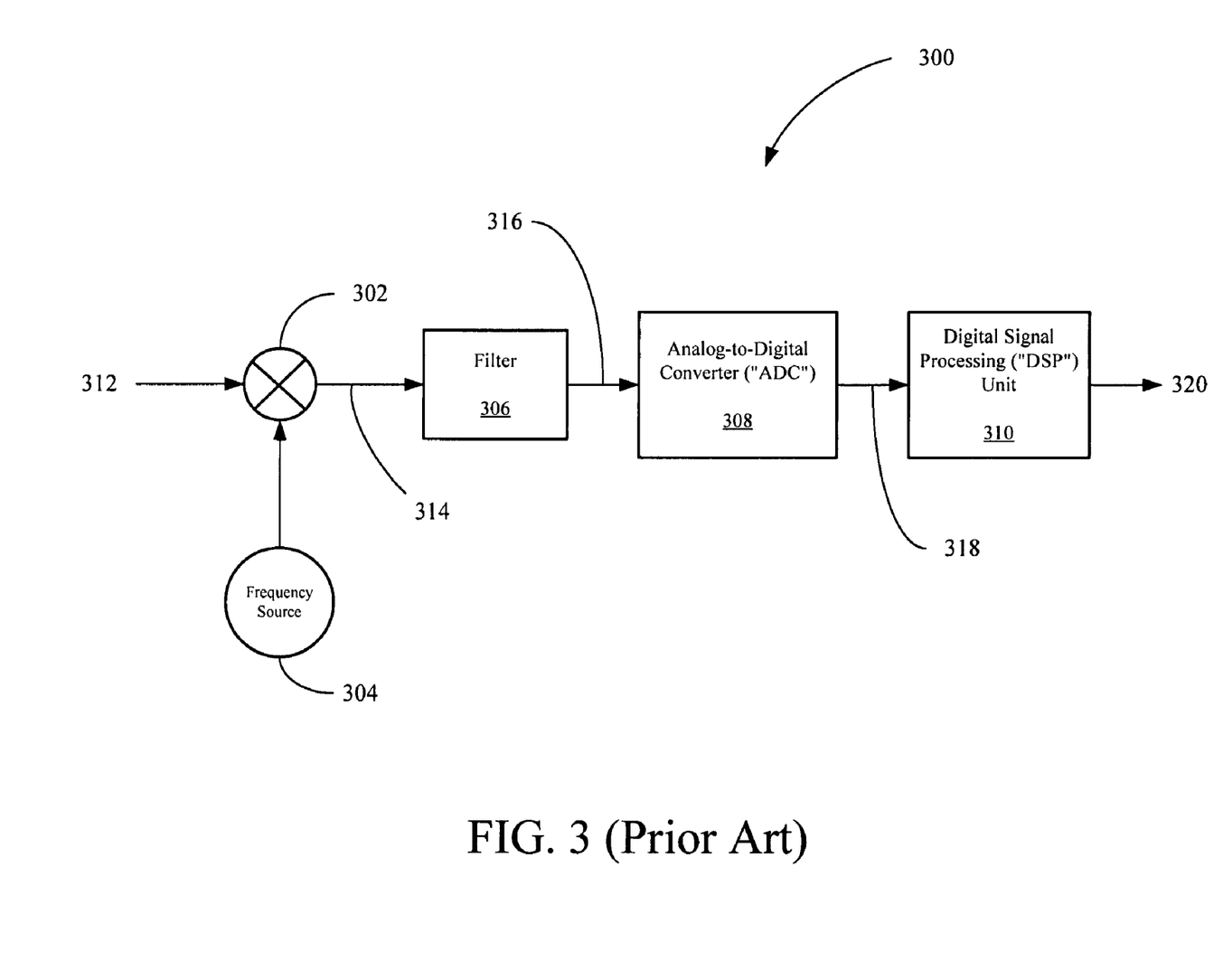
FIG. 3 is a block diagram of an example of a known state-of-the-art DBS satellite tuner-demodulator for the set-top converter box ("STB") shown in FIG. 1.

In FIG. 3, the STB architecture 300 may include frequency converter 302 (such as a mixer), a frequency source 304, a filter 306, an analog-to-digital converter ("ADC" or "A/D") 308, and a digital signal processing ("DSP") unit 310. In typical operation, a received LNB downconverted DBS satellite signal 312, from the LNB 104, is frequency converted (i.e., mixed) with the output of the frequency source (such as a local oscillator) 304, where the frequency source 304 generates a carrier frequency ("$F_c$") at the frequency converter 302.

The frequency converter output 314 is then passed to the filter 306, where the filter 306 is a band-pass filter if the frequency converter output 314 is a low intermediate frequency ("IF") signal or it is a low-pass filter if the frequency converter output 314 is a baseband signal. The resulting filter output signal 316 is then passed to the ADC 308, which converts the filter output signal 316 to a digital signal 318 that is passed to the DSP unit 310 for demodulating and/or decoding the media content on the digital signal 318. The resulting processed signal 320 is then passed to a media device (not shown) such as a television, DTV, HDTV, recording device such as a video cassette recorder ("VCR"), digital video recorder ("DVR"), recordable digital video disk ("DVD"), radio, home theater system, computer and/or broadband modem. Unfortunately, the STB architecture 300 is unable to demodulate multiple DBS satellite frequency channels simultaneously because it describes a single tuner-demodulator architecture.

Figure 4:
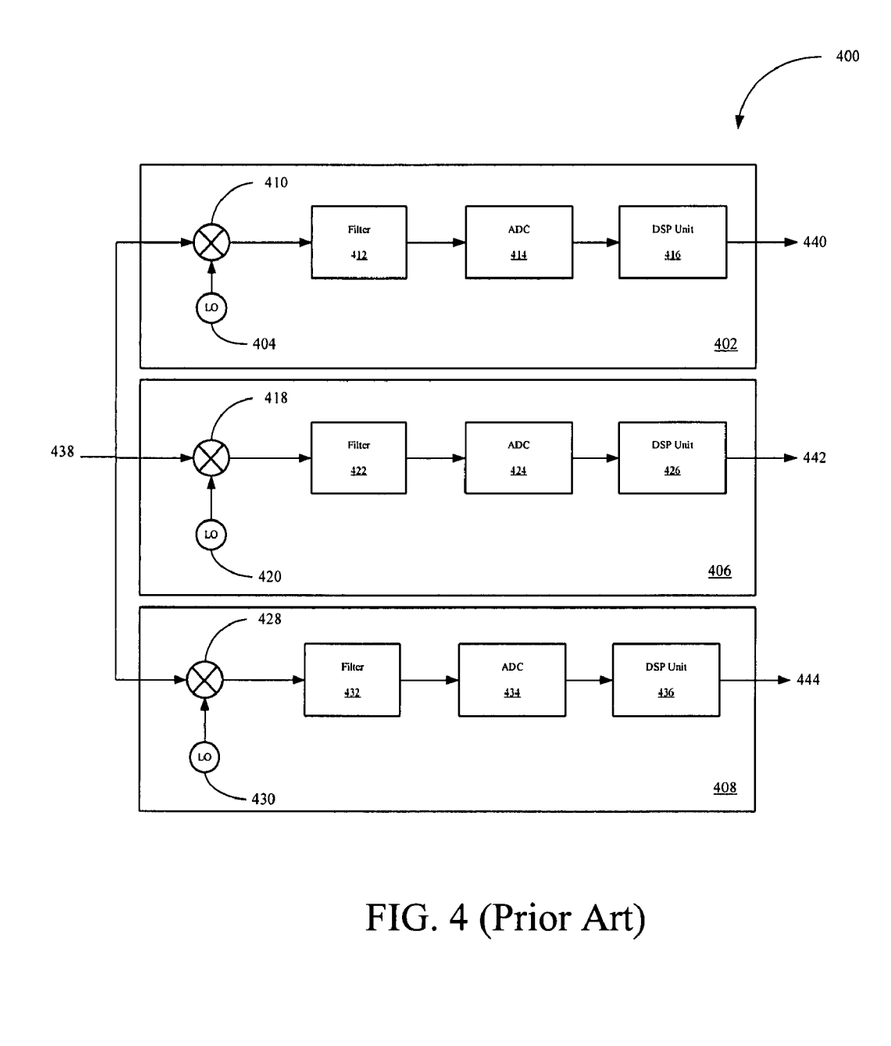
FIG. 4 is a block diagram of a known state-of-the-art example implementation of a multiple channel tuner-demodulator for the STB shown in FIG. 1.

An example attempt to solve this problem is shown in FIG. 4 that may utilize multiple channel tuner-demodulator 400 that includes multiple demodulator branches that are similar to the demodulator shown in FIG. 3. In FIG. 4, the first branch of the implementation of the demodulator similar to FIG. 3 402 tunes the frequency source (that may include a local oscillator) 404 to carrier center frequency $F_{c_1}$ for channel 1. A similar process is performed for Channel 2 406 up to Channel N 408. Similar to FIG. 3, branch 402 may include a frequency converter 410, the frequency source 404, a filter 412, an ADC 414, and a DSP unit 416. Similarly, branch 406 may include a frequency source 418, a frequency source 420, a filter 422, an ADC 424, and a DSP unit 426, and branch 408 may include a frequency converter 428, a frequency source 430, a filter 432, an ADC 434, and a DSP unit 436. The branches 402, 406 and 408 process the received digital signal 438 and produce branch outputs 440, 442 and 444, respectively.

Unfortunately, the multiple channel tuner-demodulator 400 is too complex and expensive for consumer applications. Therefore, there is a need for a cost-efficient system and method for simultaneously demodulating multiple channels that are contiguous in the frequency domain.

SUMMARY

A simultaneous multiple channel receiver ("SMCR") for receiving a combined signal having a plurality of carrier signals, where each carrier signal in the plurality of carrier signals corresponds to a frequency channel, and in response, simultaneously producing a plurality of output data stream signals, is disclosed. The SMCR may include a down-converter front-end capable of receiving the combined signal, a plurality of digital signal processors, wherein each digital signal processor of the plurality of digital signal processors is capable of producing an output data stream signal of the plurality of output data stream signals, and a multi-band filter in signal communication with both the down-converter front-end and the plurality of digital signal processors.

As an example of operation, the SMCR may down-convert the combined signal to produce a combined digitized ensemble of frequency channels ("CDEFC") signal and produce simultaneously a plurality of filtered digitized frequency channel signals from the CDEFC signal. The SMCR may then produce a plurality of output data stream signals from the plurality of filtered digitized frequency channel signals which may be passed to a plurality of media devices.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of this invention.

Figure 5:
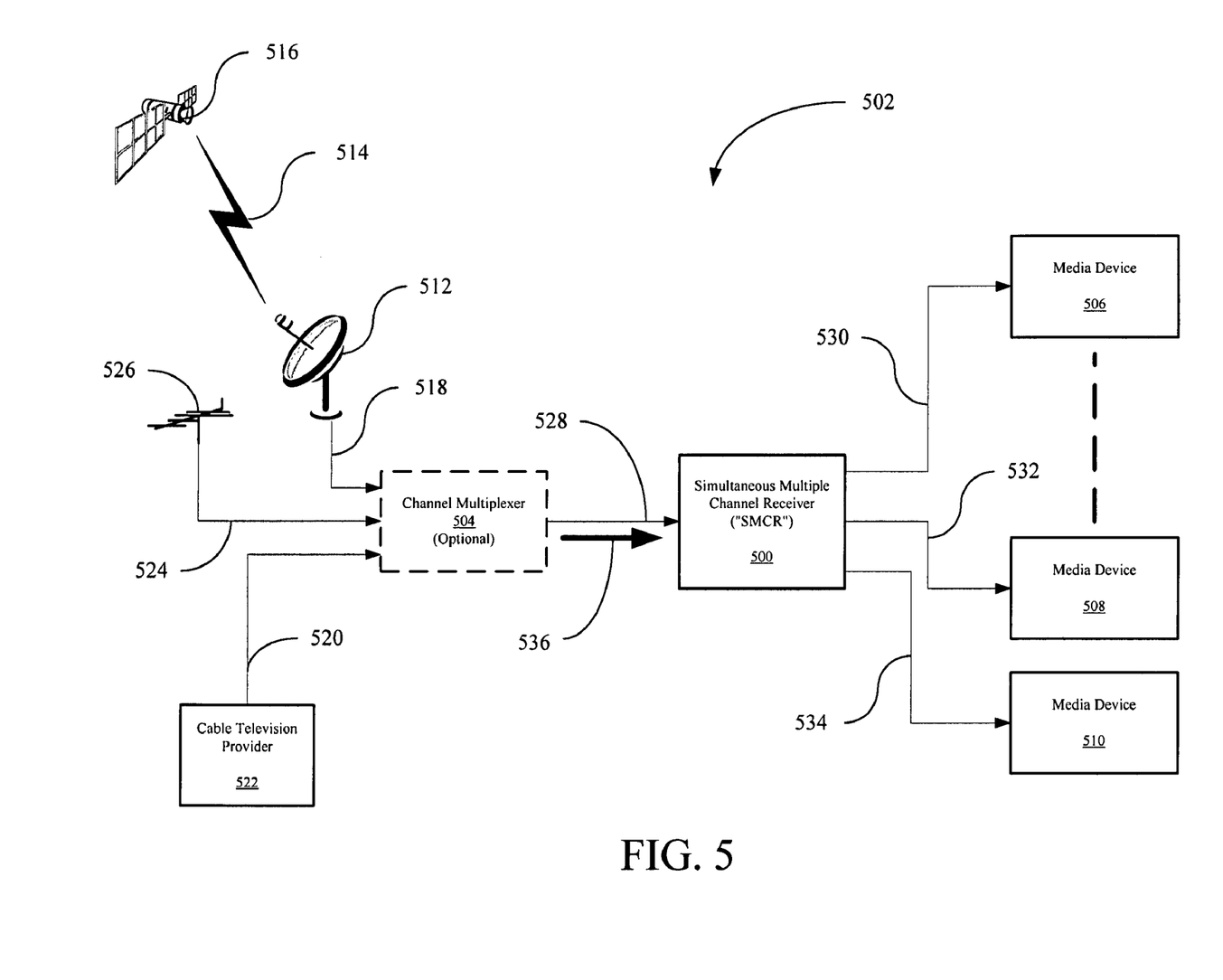
FIG. 5 is a block diagram of an example of an implementation of a Simultaneous Multiple Channel Receiver ("SMCR") within a multi-channel reception system ("MRS") in accordance with the present invention.

In FIG. 5, a Simultaneous Multiple Channel Receiver ("SMCR") 500 is shown within a multi-channel reception system ("MRS") 502. The MRS 502 may be a DBS satellite ground system and/or multi-channel cable television reception system capable of receiving and demodulating received cable television signals carrying multiple cable television channels as described by the next-generation cable project known as Next Generation Network Architecture ("NGNA").

In an example of the MRS 502 including a DBS satellite ground system, the MRS 502 may include the SMCR 500, an optional channel multiplexer 504, a plurality of media devices 506, 508, and 510, and a DBS satellite antenna 512 for receiving DBS satellite signals 514 from a DBS satellite 516. The channel multiplexer 504 is in signal communication with both the DBS satellite antenna 512 and the SMCR 500 via signal paths 518 and 528, respectively. The SMCR 500 is in signal communication with the media devices 506, 508 and 510 via signal paths 530, 532 and 534, respectively. It is appreciated by those skilled in the art that while only three media devices 506, 508 and 510 are shown, the number is for illustration purposes only and it is appreciated that any number "N" of media devices may be in signal communication with the SMCR 500 based on the maximum number of media devices that the SMCR 500 will support.

The DBS satellite antenna 512 may be any DBS satellite antenna such as a typical dish-type parabolic antenna typically utilized with DIRECTV® and DISH Network® type DBS systems and may include an LNB (not shown) packaged together as one unit with the DBS satellite antenna 512. Examples of the DBS satellite antenna 512 may include an 18-inch parabolic reflector antenna or any other type of antenna such as a phased array, resonant plane, microstrip, patch, and/or active or passive antenna. The DBS satellite antenna 512 produces a downconverted DBS received signal 518 and the MRS 502 may also receive cable television signals 520 from a cable television provider 522 and terrestrial transmission signals 524 from an outside antenna 526 and/or television distribution system within, as an example, an apartment complex that may be attached to an outside antenna 526.

In an example of the MRS 502 including a multi-channel cable television reception system, the MRS 502 may include the SMCR 500, plurality of media devices 506, 508, and 510, a straight signal path (including signal paths 520 and 528) to the cable television provider 522 without the channel multiplexer 504. In this example, the optional channel multiplexer 504 is optional because the cable television provider 522 may already provide multiple cable television channels to the SMCR 500. In this example, the multi-channel cable television reception system essentially would operate in the same manner as the example of the DBS satellite ground system without departing from the spirit of the invention.

The media devices 506, 508 and 510 may be any type of media device capable of utilizing information from a DBS satellite system, cable or terrestrial system that may include a set-top converter box (generally known as set-top box "STB" and/or Integrated Receiver Decoder "IRD"), television, digital television ("DTV"), high-definition television ("HDTV"), recording device such as a video cassette recorder ("VCR"), digital video recorder ("DVR"), recordable digital video disk ("DVD"), and digital video ("DV"), radio, digital radio, home theater system, computer, broadband modem, hard drive, video game console, MPEG-type media decoder device, and/or network communication device.

The channel multiplexer 504 may include a Multi-carrier Switch Converter ("MSC") such as described in U.S. Provisional Application Ser. No. 60/534,176, titled "Satellite Multi-Choice Switch System," filed Dec. 31, 2003, which is herein incorporated by reference in its entirety. As an example, the channel multiplexer 504 may be a device that allows several signals received from one or more DBS satellite receiver LNBs in a DBS system to be combined and transported, via a single cable, to multiple DBS satellite receiver tuner units, which are generally known as STBs. The channel multiplexer 504 frequency division multiplexes ("FDM") the received DBS satellite signals 514, cable television signals 520, and terrestrial transmission signals 524 onto multiple carrier signals that may be combined into one combined signal 536 where each carrier signal corresponds to a frequency channel. As a result, the channel multiplexer 504 allows multiple media devices (such as media devices 506, 508 and 510) to have access to several frequency channels (from one or several DBS satellite signals 514, cable television signals 520, and terrestrial transmission signals 524) simultaneously while at the same time reducing the number of required cables and other related equipment.

The SMCR 500 may include a down-converter front-end (not shown), a switch (not shown) in signal communication with the demodulator front-end, a bank of adaptive filters (not shown) in signal communication with the switch, a transform unit (not shown) in signal communication with the bank of adaptive filters, and a bank of digital signal processors ("DSP") units in signal communication with the transform unit. The SMCR 500 is capable of receiving combined signal 536 that includes multiple modulated carriers on different frequency channels and tuning and demodulating multiple modulated carriers within the combined signal 536 in concert to produce the plurality of output data stream signals 530, 532 and 534 that may be passed to the media devices 506, 508 and 510, respectively, where each output data stream signal 530, 532 and 534 represents a data stream that is a stream of digital data that generally has some type of media content that may include video, audio and/or data. The frequency channels may include modulated signals that have multiple streams of data modulated onto one or more carrier signals. While only three output data stream signals 530, 532 and 534 are shown for illustration purposes, it is appreciated that the SMCR 500 is capable of producing N output data stream signals. The frequency channels may be generally defined as specific frequency bands of the electromagnetic spectrum.

Figure 6:
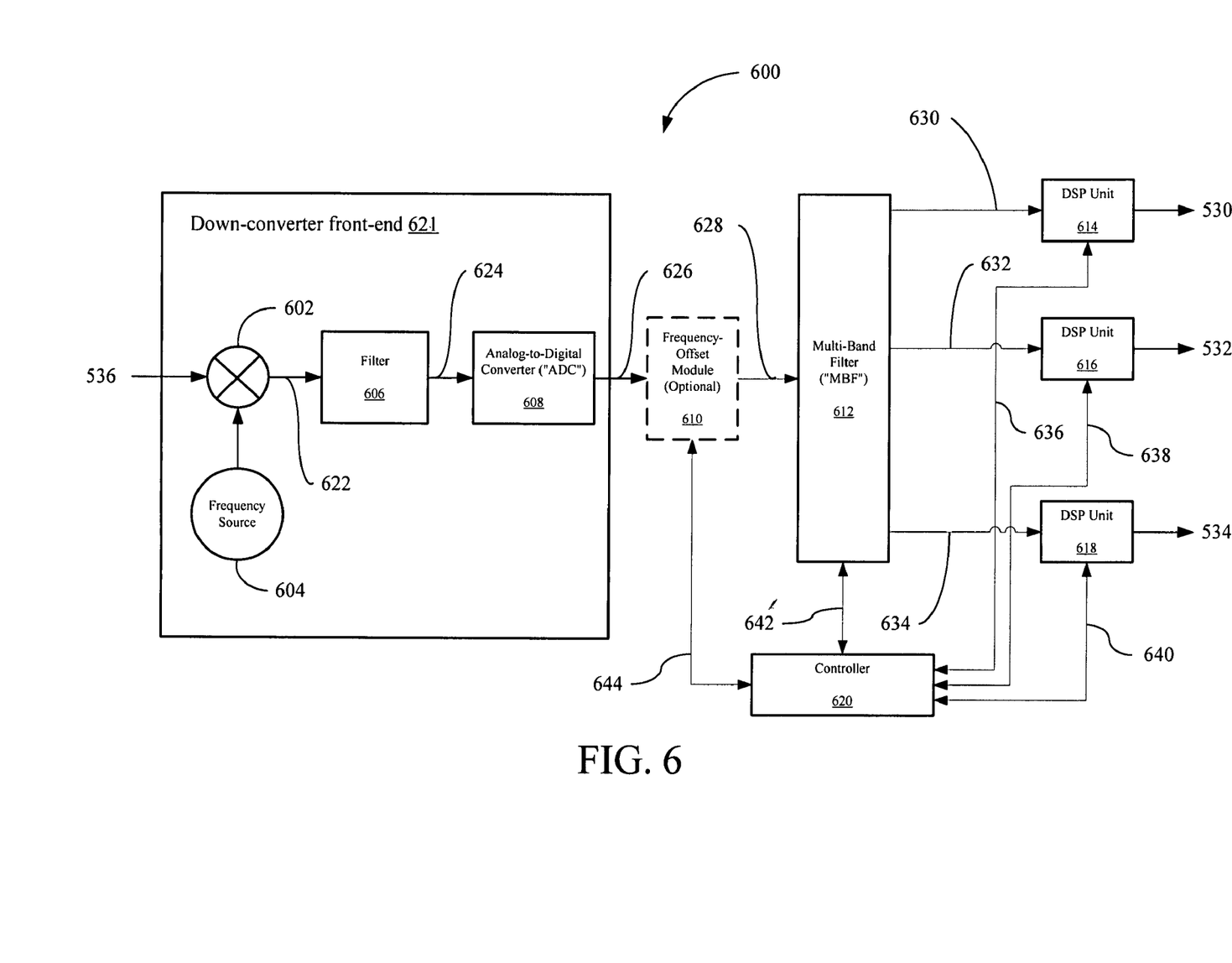
FIG. 6 is a block diagram of an example of an implementation of the SMCR shown in FIG. 5.

FIG. 6 is a block diagram of the SMCR 600 within the MRS 502, FIG. 5. The SMCR 600, FIG. 6, may include a frequency converter 602 (such as a mixer), a frequency source 604, a filter 606, an analog-to-digital converter ("ADC" or "A/D") 608, optional frequency-offset module 610, multi-band filter ("MBF") 612, DSP units 614, 616, and 618, and controller 620. The combination of the frequency converter 602, frequency source 604, filter 606 and ADC 608 may be generally known as the down-converter front-end 621 of the SMCR 600. It is appreciated by those skilled in the art that the down-converter front-end 621 may also include a tuning module (not shown), and that the down-converter front-end 621 is capable of performing both downconverting and tuning independently as well as in combination.

In typical operation, the SMCR 600 receives the combined signal 536 from the channel multiplexer 504. The combined signal 536 may include N-frequency channels where N represents the total number of frequency channels in the MRS 502, FIG. 5. The combined signal 536 is frequency converted (i.e., mixed) in frequency converter 602 with the output of the frequency source (such as a local oscillator) 604, where the frequency source 604 generates a carrier frequency ("$F_c$") that is injected into the frequency converter 602.

The frequency converter output 622 is then passed to the filter 606, where the filter 606 is a band-pass filter if the frequency converter output 622 is a low intermediate frequency ("IF") signal or it is a low-pass filter if the frequency converter output 622 is a baseband signal. The resulting filter output signal 624 is then passed to the ADC 608, which converts the filter output signal 624 to a combined digitized ensemble of frequency channels ("CDEFC") signal 626 which is a signal that represents the sampled digitized ensemble of frequency channels. The CDEFC signal 626 includes multiple data streams of digital data from the N-frequency channels that have generally some type of media content that may include video, audio and/or data.

The optional frequency-offset module 610 may de-rotate the frequencies in the CDEFC signal 626 in order to compensate, in the front-end, for the offsets of the DSP units 614, 616 and 618 without having each of DSP units 614, 616 and 618 compensate for its individual offset independently from the other DSP units. While in general each one of these DSP units 614, 616 and 618 is typically capable of calculating its own frequency offset, allowing the de-rotation before the MBF 612 allows the SMCR 600 to maintain statistics for the common offset of each of the frequency channels, aggregate it, and then apply the aggregation back to obtain typically a more accurate compensation for the DPS units 614, 616 and 618 common frequency offsets that what would typically result from each of DPS units 614, 616 and 618 compensating for it own offset. It is appreciated by one skilled in the art that the optional frequency-offset module 610 is capable of correcting for the common frequency offset of the DPS units 614, 616 and 618. However, the offsets that are not common within the DPS units 614, 616 and 618 are generally corrected by the individual DPS units 614, 616 and 618.

The optional frequency-offset module 610 may then produce a de-rotated CDEFC signal 628, which is the de-rotated version of CDEFC signal 626, and pass the de-rotated CDEFC signal 628 to the MBF 612. If there is no optional frequency-offset module 610, the signal passed to the MBF 612 is the CDEFC signal 626.

The MBF 612 receives either the CDEFC signal 626 or the de-rotated CDEFC signal 628 and processes it to produce the N plurality of filtered digitized frequency channel ("FDFC") signals (such as FDFC signals 630, 632 and 634) that are passed to the plurality of DSP units (such as DSP units 614, 616 and 618). The FDFC signals 630, 632 and 634 may be N match filtered parallel streams of digital data that are digitized representations of each frequency channel within the combined signal 536 having N-frequency channels. The characteristics of these data streams may be digital data such as encrypted, unencrypted, QAM, QPSK, DSS type data that represents media content such as video, audio, and/or data.

The DSP units 614, 616 and 618 may be general purpose DSP units with optional forward error correction ("FEC") modules. In operation, the DSP units 614, 616 and 618 may demodulate and optionally forward error correct the FDFC signals 630, 632 and 634 to produce the plurality of output data stream signals 530, 532 and 534 that may be passed to the media devices 506, 508 and 510, FIG. 5, respectively, where each output data stream signal 530, 532 and 534 represents a data stream that is a stream of digital data that generally has some type of media content that may include video, audio and/or data. The forward error correction is optional based on whether the combined signal 536 is a digital signal from a DBS satellite or digital cable signal, or a non-digital signal from a non-digital cable or terrestrial transmission signal. In the situation where the combined signal 536 is a non-digital signal, the CDEFC signal 626 from the ADC 608 is not a true digital-content digital signal but instead a digital signal that represents the digitally sampled analog combined signal 536. It is appreciated by those skilled in the art that if the combined signal 536 is a sampled analog signal, forward error correction generally may not be required.

The controller 620 may be any processor type of controller including a processor, microprocessor, and/or microcontroller. The controller 620 may be a hardwired device (or an element within the hardwired device) such as an application specific semiconductor device ("ASIC") or programmable device that is capable of running software code that may be stored in a memory unit (not shown) in the SMCR 600.

The controller 620 may be in signal communication with the DSP units 614, 616 and 618, MBF 612 and the optional frequency-offset module 610 via signal paths 636, 638, 640, 642 and 644, respectively. In an example of operation, the controller 620 may receive the offset values from the DSP units 614, 616 and 618 and in response, adjust the optional frequency-offset module 610 and/or the MBF 612. Additionally, the controller 620 may monitor the forward error correction values of the DSP units 614, 616 and 618 and adjust the MBF 612 in response.

In general, the controller 620 may control and coordinate the functions of the SMCR 600 and its constituent components, including the DSP units 614, 616 and 618. The controller 620 may be utilized to load new filter coefficients, different tracking or acquisition loop parameters and constants, or new microcode that controls startup or tracking operation. The controller 620 may also request and compile statistics (such as BER and/or demod/FEC lock of various channels) that may be utilized in determining or setting operational modes. It appreciated by those skilled in the art that these statistics may also be aggregated and sent as reports to some higher layer software entity (not shown).

Figure 7:
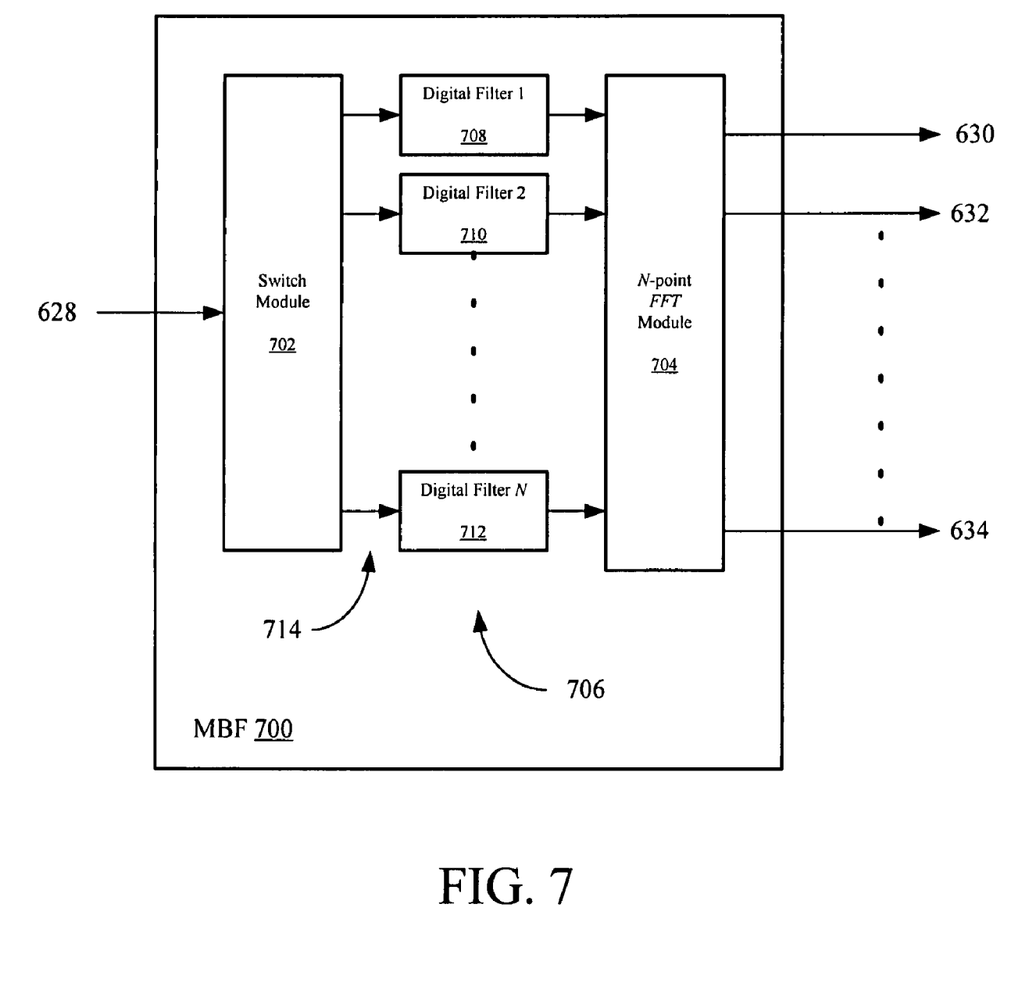
FIG. 7 is a block diagram of an example of an implementation of the multi-band filter ("MBF") shown in FIG. 6.

In FIG. 7, an example of an implementation for the MBF 700 is shown. The MBF 700 may include a switch module 702, N-point fast Fourier transform ("FFT") module 704 and a bank of N-digital filters 706 that include, as examples, digital filter 1 708, digital filter 2 710 and digital filter N 712. The switch module 702 is basically a serial-to-parallel converter that may be implemented as a demultiplexer that decimates the received CDEFC signal 626 or the de-rotated CDEFC signal 628 from either the ADC 608 or the optional frequency-offset module 610 into the bank of N-digital filters 706. The switch outputs of the switch module 702 are sub-sampled digitized ensemble of channel ("SDEC") signals 714 of the received CDEFC signal 626 or the de-rotated CDEFC signal 628. The bank of N-digital filters 706 may be implemented in either an N-bank of finite impulse response ("FIR") or infinite impulse response ("IIR") filters. The N-point FFT module 704 may be implement by any well-known FFT approach.

As an example of operation, the combined signal 536 is multiplied by a carrier frequency $F_c$ produced by the frequency source 604 at the frequency converter 602. The carrier frequency of the $i^{th}$ frequency channel produced by the frequency source 604 is generally $F_{c_i}=F_1+(i-1)F_s$ Hz, where $F_1$ is the frequency of the first frequency channel, $F_s$ is the frequency spacing between the two adjacent frequency channels, and $i=1, 2, \ldots, N$ is generally known as the frequency channel index. The frequency source 604 typically generates a carrier frequency $$F'_{c_i} = \frac{(F_{c_1} + F_{c_N})}{2}.$$

The frequency converter output 622 is then passed to the filter 606, which in this example may be a low-pass filter. The filter 606 removes the alias and harmonics and passes the filter output signal 624 to the ADC 608. The ADC 608 may be clocked by a sampling clock signal (not shown) and it converts the filter output signal 624 into the CDEFC signal 626 having sampling frequency $F_s$. Assuming no optional frequency-offset signal 610, the CDEFC signal 626 is then passed to the switch module 702, in the MBF 700, that decimates the CDEFC signal 626 to produce the SDEC signals 714 that are passed into the bank of N-digital filters 706 (in this example a N-bank of the FIR filters). The switch module 702 may also be clocked by same sampling clock signal (not shown) utilized to clock the ADC 608. The digital filters 708, 710 and 712 process the decimated SDEC signals 714 and pass the match filtered results to the N-point FFT module 704, which performs an FFT on the received outputs from the FIR bank 706 and passes the resulting FDRC signals 630, 632 and 634 to the bank of DSP units 614, 616 and 618. The DSP units 614, 616 and 618 then demodulate and decode the received FDRC signals 630, 632 and 634 from the N-point FFT module 704 into the plurality of output data stream signals 530, 532 and 534, respectively.

Figure 8:
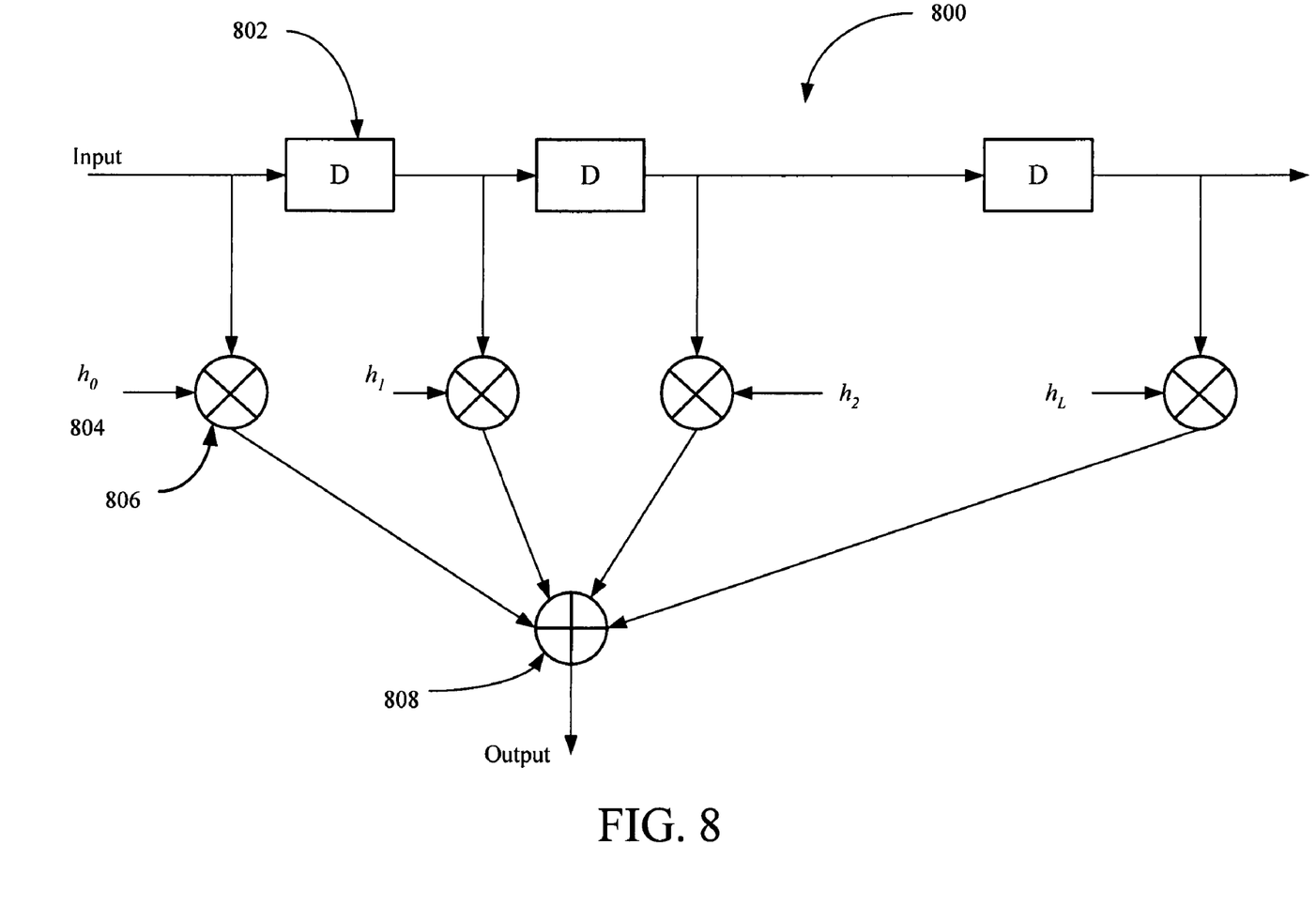
FIG. 8 is a block diagram of an example of an implementation of the digital filter shown in FIG. 7 as an example finite impulse response ("FIR") filter.

In FIG. 8, an example of an implementation of the FIR filter 800 as one of the digital filters of the bank of digital filters 706 is shown. The FIR filter 800 may comprise a L shift delay 802 line, coefficients $h_0, h_1, \ldots, h_L$ 804, multipliers 806, and adders 808. Typically, by designing the coefficients $h_0, h_1, \ldots, h_L$ 804 for a given sampling frequency $F_{sample}$, and utilizing these coefficients properly, the FIR filter 800 may be configured to behave as a low-pass, band-pass, or high-pass filter.

Figure 9:
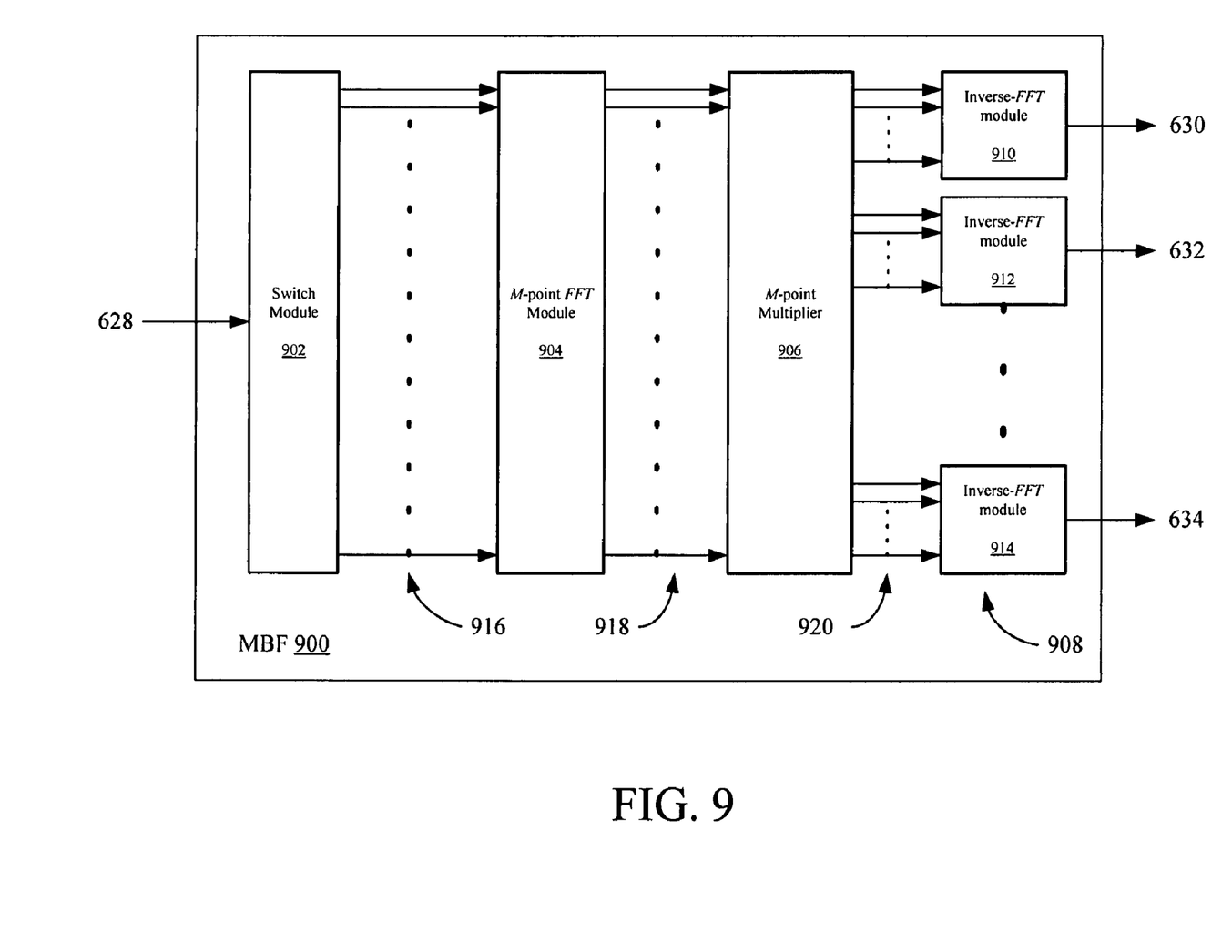
FIG. 9 is a block diagram of another example of an implementation of the MBF shown in FIG. 6.

In FIG. 9, another example of an implementation for the MBF 900 is shown. The MBF 900 may include a switch module 902, M-point FFT module 904, an M-point multiplier 906, and a bank of inverse-FFT (also generally known as "IFFT") modules 908 such as inverse-FFT modules 910, 912 and 914, where M is the dimension of the FFT and may be equal to N times the frequency. The switch module 902 is basically a serial-to-parallel converter that may be implemented as a demultiplexer that decimates the received CDEFC signal 626 or the de-rotated CDEFC signal 628 from either the ADC 608 or the optional frequency-offset module 610 into a plurality of M SDEC signals 916.

The M SDEC signals 916 are passed to the M-point FFT module 904 that takes the FFT of every individual M SDEC signal 916 and passes the resulting transformed signals 918 to the M-point multiplier 906. The M-point multiplier 906 may implement a frequency mask of an ensemble of matched filters that matches the ensemble of frequency multiplexed channels to be processed. The outputs of the M-point multiplier 906 pass one or more selected channel outputs 920 to a bank of one or more inverse-FFT modules 908, with (typically) one inverse-FFT module assigned per channel. Each of the inverse-FFT modules 910, 912 and 914 releases a block of data (of length identical to the length of the IFFT) for each channel. In an example of an application utilizing this approach, the leading and trailing temporal samples within an IFFT output data block may be discarded. The filtered outputs 920 may be organized according to a programmable topology that allows for the outputs of the bank of inverse-FFT modules 908 (such as inverse-FFT modules 910, 912 and 914) to be the FDRC signals 630, 632 and 634. The FDRC signals 630, 632 and 634 are then passed to the DSP units 614, 616 and 618 that demodulate and decode the FDRC signals 630, 632 and 634 from the bank of inverse-FFT modules 908 into the plurality of output data stream signals 530, 532 and 534.

Figure 10:
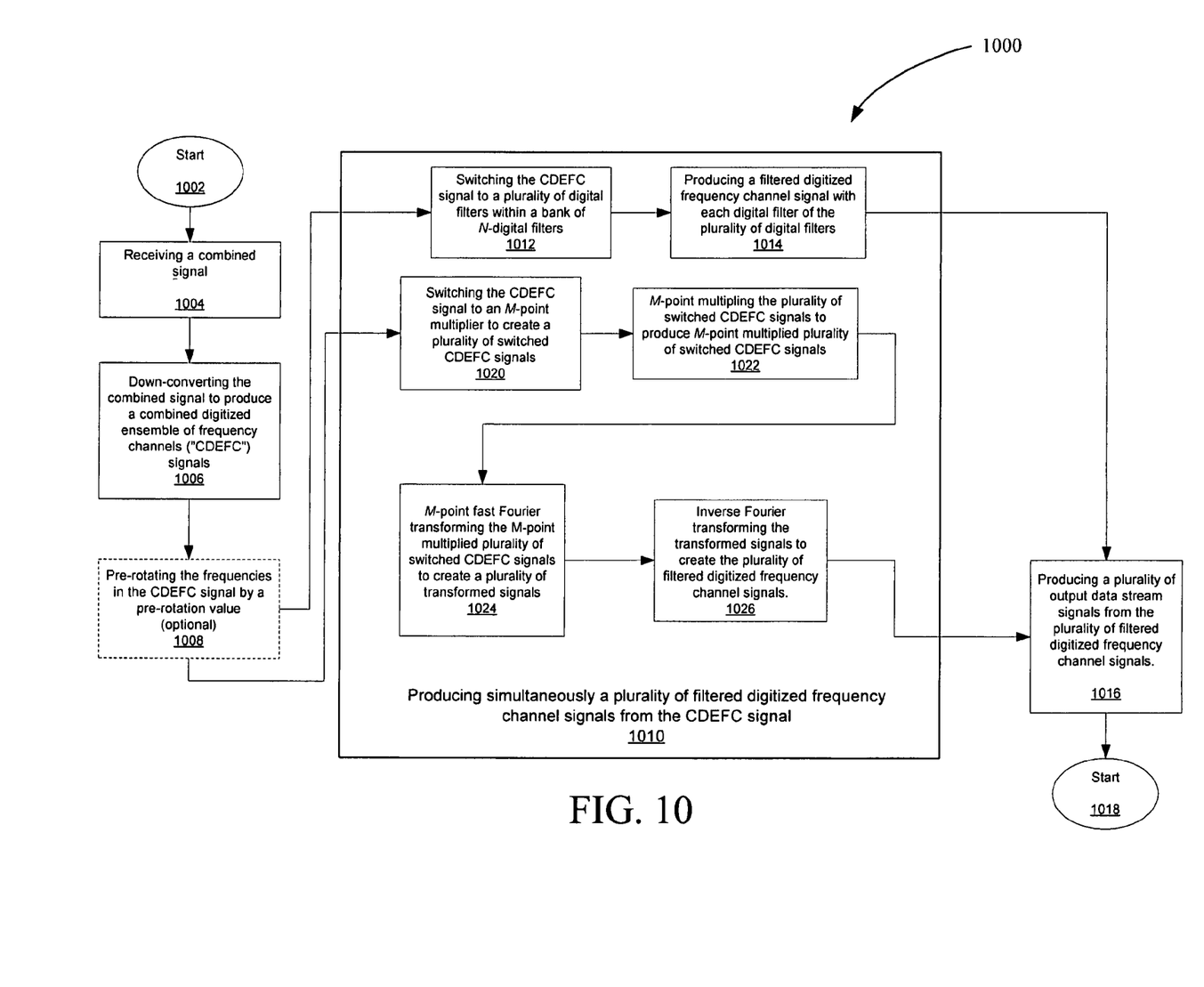
FIG. 10 is a flowchart of an example of a process performed by the SMCR shown in FIG. 6.

FIG. 10 is a flowchart 1000 illustrating an example of a process performed by the SMCR 600. The process begins in step 1002, FIG. 10, and continues to step 1004. In step 1004, the down-converter 621, FIG. 6, of the SMCR 600 receives the combined signal 536 and, in step 1006, FIG. 10, down-converts the combined signal to produce the CDEFC signal. If an optional frequency offset module is utilized, the optional frequency offset module pre-rotates the frequencies in the CDEFC signal by a pre-rotation value in optional step 1008. Then in step 1010, the MBF 612, FIG. 6, produces simultaneously a plurality of filtered digitized frequency channel signals from the CDEFC signal.

If the MBF 700, FIG. 7, is implemented utilizing a switch module 702, N-point FFT module 704 and a bank of N-digital filters 706, the process continues to sub-step 1012, FIG. 10. In sub-step 1012, the switch module 702 switches the CDEFC signal to a plurality of digital filters within the bank of N-digital filters 706 and, in sub-step 1014, each digital filter of the plurality of digital filters produces a filtered digitized frequency channel signal. Each filtered digitized frequency channel signal is then passed to a DSP unit and, in step 1016, each DSP unit produces an output data stream signal of a plurality of output data stream signals. The process then ends in step 1018.

If instead, the MBF 900, FIG. 9, is implemented utilizing a switch module 902, M-point FFT module 904, an M-point multiplier 906, and a bank of inverse-FFT modules 908, the process continues instead to sub-step 1020, FIG. 10. In sub-step 1020, the switch module 902 switches the CDEFC signal to an M-point multiplier to create a plurality of switched CDEFC signals. In sub-step 1022, M-point FFT module 904, M-point multiplies the plurality of switched CDEFC signals to produce M-point multiplied plurality of switched CDEFC signals and, in sub-step 1024, M-point FFT module 904, M-point fast Fourier transforms the M-point multiplied plurality of switched CDEFC signals to create a plurality of transformed signals. In step 1026, the transformed signals are inverse-Fourier transformed (with inverse-FFT modules) to create the plurality of filtered digitized frequency channel signals. Each filtered digitized frequency channel signal is then passed to a DSP unit and, in step 1016, each DSP unit produces an output data stream signal of a plurality of output data stream signals. The process then ends in step 1018.

The processes described in FIG. 10 may be performed by hardware or software. If the process is performed by software, the software may reside in software memory (not shown) in the controller 620. The software in memory may include an ordered listing of executable instructions for implementing logical functions (i.e., "logic" that may be implemented either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, i.e., "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A simultaneous multiple channel receiver ("SMCR") for receiving a combined signal having a plurality of carrier signals, where each carrier signal in the plurality of carriers signals corresponds to a frequency channel, and in response simultaneously producing a plurality of output data stream signals, the SMCR comprising:
  a down-converter front-end capable of receiving the combined signal;
  a plurality of digital signal processors, wherein each digital signal processor of the plurality of digital signal processors is capable of producing an output data stream signal of the plurality of output data stream signals;
  a multi-band filter in signal communication with both the down-converter front-end and the plurality of digital signal processors; and
  a controller in signal communication with the plurality of digital signal processors and multi-band filter, wherein the controller is capable of loading new filter coefficients into the multi-band filter;
  a frequency-offset module located in a signal path between the down-converter front-end and the multi-band filter and in signal communication with the controller, wherein the frequency-offset module pre-rotates the frequencies in a combined digitized ensemble of frequency channels signal ("CDEFCS") produced by the down-converter front-end by a pre-rotation value to correct for a common frequency offset of the plurality of digital signal processors, wherein the pre-rotation value is determined by the controller in response to receiving offset signals from the plurality of digital signal processors.

2. The SMCR of claim 1, wherein the down-converter front-end comprises:
  a frequency converter;
  an analog-to-digital converter; and
  a filter in signal communication with the frequency converter and analog-to-digital converter.

3. The SMCR of claim 1, wherein the multi-band filter comprises:

a switch module;
a fast Fourier transform module; and
a bank of digital filters in signal communication with the switch module and fast Fourier transform module.

4. The SMCR of claim 3, wherein each digital filter of the plurality of digital filters is a finite impulse response ("FIR") type of digital filter.

5. The SMCR of claim 3, wherein each digital filter of the plurality of digital filters is an infinite impulse response ("IIR") type of digital filter.

6. The SMCR of claim 3, wherein the down-converter front-end comprises:
a frequency converter;
an analog-to-digital converter; and
a filter in signal communication with the frequency converter and analog-to-digital converter.

7. The SMCR of claim 1, wherein the multi-band filter comprises:
a switch module;
an M-point multiplier;
an M-point fast Fourier transform module in signal communication with the switch module and M-point multiplier; and
a plurality of inverse Fourier transform modules in signal communication with the M-point multiplier.

8. The SMCR of claim 7, wherein the down-converter front-end comprises:
a frequency converter;
an analog-to-digital converter; and
a filter in signal communication with the frequency converter and analog-to-digital converter.

9. The SMCR of claim 1, wherein the down-converter front-end comprises:
a frequency converter;
an analog-to-digital converter; and
a filter in signal communication with the frequency converter and analog-to-digital converter.

10. The SMCR of claim 1, wherein the multi-band filter comprises:
a switch module;
a fast Fourier transform module; and
a bank of digital filters in signal communication with the switch module and fast Fourier transform module.

11. The SMCR of claim 10, wherein the down-converter front-end comprises:
a frequency converter;
an analog-to-digital converter; and
a filter in signal communication with the frequency converter and analog-to-digital converter.

12. The SMCR of claim 10, wherein the combined signal is produced by a channel multiplexer.

13. The SMCR of claim 12, wherein the channel multiplexer receives at least one signal from a cable television provider.

14. The SMCR of claim 12, wherein the channel multiplexer receives at least one signal from a terrestrial television antenna.

15. The SMCR of claim 10, wherein the down-converter front-end receives at least one signal from a cable television provider.

16. The SMCR of claim 10, wherein the down-converter front-end receives at least one signal from a terrestrial television antenna.

17. The SMCR of claim 1, wherein the multi-band filter comprises:
a switch module;
an M-point multiplier;
an M-point fast Fourier transform module in signal communication with the switch module and M-point multiplier; and
a plurality of inverse Fourier transform modules in signal communication with the M-point multiplier.

18. The SMCR of claim 17, wherein the down-converter front-end comprises:
a frequency converter;
an analog-to-digital converter; and
a filter in signal communication with the frequency converter and analog-to-digital converter.

19. The SMCR of claim 18, wherein the combined signal is produced by a channel multiplexer.

20. The SMCR of claim 19, wherein the channel multiplexer receives at least one signal from a cable television provider.

21. The SMCR of claim 19, wherein the channel multiplexer receives at least one signal from a terrestrial television antenna.

22. The SMCR of claim 17, wherein the down-converter front-end receives at least one signal from a cable television provider.

23. The SMCR of claim 17, wherein the down-converter front-end receives at least one signal from a terrestrial television antenna.

24. The SMCR of claim 1, wherein the combined signal is produced by a channel multiplexer.

25. The SMCR of claim 24, wherein the channel multiplexer includes a multi-carrier switch converter.

26. The SMCR of claim 24, wherein the channel multiplexer receives at least one DBS satellite signal.

27. The SMCR of claim 26, wherein the channel multiplexer receives at least one signal from a cable television provider.

28. The SMCR of claim 26, wherein the channel multiplexer receives at least one signal from a terrestrial television antenna.

29. The SMCR of claim 1, wherein the down-converter front-end receives at least one signal from a cable television provider.

30. The SMCR of claim 1, wherein the down-converter front-end receives at least one signal from a terrestrial television antenna.

31. The SMCR of claim 1, wherein the controller is configured to monitor forward error correction values of the digital signal processors and to adjust the multi-band filter in response to the monitoring.

32. A simultaneous multiple channel receiver ("SMCR") for receiving a combined signal having a plurality of carrier signals, where each carrier signal in the plurality of carriers signals corresponds to a frequency channel, and in response producing a plurality of output data stream signals, the SMCR comprising:
means for down-converting the combined signal;
a plurality of digital signal processors, wherein each digital signal processor of the plurality of digital signal processors includes means for producing an output data stream signal of the plurality of output data stream signals; and
a multi-band filter in signal communication with both the down-converting means and the plurality of digital signal processors;
means for controlling in signal communication with the plurality of digital signal processors and multi-band filter;
a frequency-offset module located in a signal path between the means for down-converting and the multi-band filter and in signal communication with the controlling means, wherein the frequency offset module pre-rotates the frequencies in a combined digitized ensemble of frequency channels ("CDEFC") signal produced by the down-converting means by a pre-rotation value to correct for a common frequency offset of the plurality of digital signal processors, wherein the pre-rotation value is determined by the controlling means in response to receiving offset signals from the plurality of digital signal processors.

33. The SMCR of claim 32, wherein the controlling means is configured to load new filter coefficients into the multi-band filter.

34. The SMCR of claim 32, wherein the down-converting means comprises: a frequency converter; an analog-to-digital converter; and a filter in signal communication with the frequency converter and analog-to-digital converter.

35. The SMCR of claim 32, wherein the multi-band filter comprises: a switch module; a fast Fourier transform module; and a bank of digital filters in signal communication with the switch module and fast Fourier transform module.

36. The SMCR of claim 32, wherein the multi-band filter comprises: a switch module; an M-point multiplier; an M-point fast Fourier transform module in signal communication with the switch module and M-point multiplier; and a plurality of inverse Fourier transform modules in signal communication with the M-point multiplier.

37. The SMCR of claim 32, wherein the combined signal is produced by a channel multiplexer.

38. The SMCR of claim 37, wherein the channel multiplexer includes a multi-carrier switch converter.

39. The SMCR of claim 37, wherein the channel multiplexer receives at least one DBS satellite signal.

40. The SMCR of claim 39, wherein the channel multiplexer receives at least one signal from a cable television provider.

41. The SMCR of claim 39, wherein the channel multiplexer receives at least one signal from a terrestrial television antenna.

42. The SMCR of claim 32, wherein the down-converting means receives at least one signal from a cable television provider.

43. The SMCR of claim 32, wherein the down-converting means receives at least one signal from a terrestrial television antenna.

44. A method for simultaneously demodulating a combined signal having a plurality of carrier signals, where each carrier signal in the plurality of carrier signals corresponds to a frequency channel, in a simultaneous multiple channel receiver ("SMCR"), the method comprising:
    down-converting the combined signal to produce a combined digitized ensemble of frequency channels ("CDEFC") signal;
    producing simultaneously a plurality of filtered digitized frequency channel signals from the CDEFC signal; and
    producing a plurality of output data stream signals from the plurality of filtered digitized frequency channel signals;
    wherein producing simultaneously a plurality of filtered digitized frequency channel signals from the CDEFC signal includes switching the CDEFC signal to a plurality of digital filters;
    wherein each digital filter of the plurality of digital filters produces a filtered digitized frequency channel signal;
    wherein producing a plurality of output data stream signals includes digital signal processing each filtered digitized frequency channel signal to produce an output data stream signal of the plurality of output data stream signals;
    pre-rotating the frequencies in the CDEFC signal by a pre-rotation value before producing simultaneously the plurality of filtered digitized frequency channel signals to correct for a common frequency offset of the digital signal processing of each filtered digitized frequency channel signal;
    receiving offset signals from a plurality of digital signal processors; and
    determining the pre-rotation value with a controller in response to the received offset signals.

45. The method of claim 44, further including loading new filter coefficients into a multi-band filter with the controller.

46. The method of claim 44, wherein down-converting further includes: frequency converting the combined signal; filtering the frequency converted combined signal; and converting the filtered frequency converted combined signal to the CDEFC signal with an analog-to-digital converter.

47. The method of claim 44, wherein producing simultaneously a plurality of filtered digitized frequency channel signals from the CDEFC signal comprises:
    switching the CDEFC signal to an M-point multiplier to create a plurality of switched CDEFC signals;
    M-point multiplying the plurality of switched CDEFC signals;
    M-point fast Fourier transforming the M-point multiplied plurality of switched CDEFC signals to create a plurality of transformed signals; and
    inverse-Fourier transforming the transformed signals to create the plurality of filtered digitized frequency channel signals.

48. The method of claim 47, wherein producing a plurality of output data stream signals includes digital signal processing each filtered digitized frequency channel signal to produce an output data stream signal of the plurality of output data stream signals.

49. The method of claim 48, further including pre-rotating the frequencies in the CDEFC signal by a pre-rotation value before producing simultaneously the plurality of filtered digitized frequency channel signals.

50. The method of claim 49, further including:
    receiving offset signals from a plurality of digital signal processors; and
    determining the pre-rotation value with a controller in response to the received offset signals.

51. The method of claim 50, further including loading new filter coefficients into a multi-band filter with the controller.

52. The method of claim 47, wherein down-converting further includes:
    frequency converting the combined signal;
    filtering the frequency converted combined signal; and
    converting the filtered frequency converted combined signal to the CDEFC signal with an analog-to-digital converter.

53. The method of claim 44, wherein the combined signal is produced by a channel multiplexer.

54. The method of claim 53, wherein the channel multiplexer includes a multi-carrier switch converter.

55. The method of claim 53, further comprising receiving at least one DBS satellite signal at the channel multiplexer.

56. The method of claim 55, further comprising receiving at least one signal from a cable television provider.

57. The method of claim 55, further comprising receiving at least one signal from a terrestrial television antenna.

58. The method of claim 44, further comprising receiving at least one signal from a cable television provider.

59. The method of claim 44, further comprising receiving at least one signal from a terrestrial television antenna.

60. The method of claim 44, further comprising passing the plurality of output data stream signals to a plurality of media devices.

61. The method of claim 60, wherein each media device of the plurality of media devices is selected from a group consisting of:
- a set-top converter box ("STB");
- a television;
- a digital television ("DTV");
- a high-definition television ("HDTV");
- a recording device;
- a digital video recorder ("DVR");
- a recordable digital video disk ("DVD");
- a digital video ("DV");
- a radio;
- a digital radio;
- a home theater system;
- a computer;
- a broadband modem;
- a hard drive;
- a video game console;
- an MPEG-type media decoder device; and
- a network communication device.

62. The method of claim 44, further comprising:
- monitoring statistics for a common offset of each of the frequency channels; and
- using the statistics to determine the pre-rotation value.

63. The method of claim 62, further comprising aggregating the statistics and using the aggregated statistics to determine the pre-rotation value.

* * * * *